United States Patent Office 2,854,492
Patented Sept. 30, 1958

2,854,492

PROCESS FOR CATALYTIC DEHYDROGENATION OF HYDROCARBONS AND THEIR DERIVATIVES

George Alexander Mills, Swarthmore, and Sol W. Weller, Drexel Hill, Pa., and Leon W. Wright, Wilmington, Del., assignors to Houdry Process Corporation, Wilmington, Del., a corporation of Delaware No Drawing. Application September 2, 1953
Serial No. 378,174

7 Claims. (Cl. 260—668)

The present invention relates to the dehydrogenation of dehydrogenizable hydrocarbons, such as paraffins, and dehydrogenizable hydrocarbon compounds in the presence of catalysts, and it is more particularly concerned with the use of mixtures comprising at least one member from the class consisting of alkali metals, and alkaline earth metals and a member of the class consisting of the hydrides of the selected metal(s) as catalysts in such dehydrogenation processes.

The hydrocarbons which are suitable for catalytic dehydrogenation include isobutane, cyclohexane and alkyl derivatives of the cyclohexane, all of which have a nucleus of at least 3, but not more than 6 carbon atoms. The number of carbon atoms in the nucleus is the same as the number of carbon atoms in the ring in mononuclear naphthenes, and as the number of carbons in the longest chain in acyclic hydrocarbons.

It has previously been proposed to make use of the alkali metal hydrides and alkaline earth metal hydrides as catalysts in the treatment of high-molecular weight organic material such as tars, pitch, coal and petroleum distillates and the like with hydrogen under high pressure and at elevated temperature, in order to form compounds of lower molecular weight by cracking and simultaneous hydrogenation, and it has also been proposed to hydrogenate naphthalene and anthracene in the presence of sodium hydride.

It has now been found that mixtures comprising at least one member of the class consisting of the alkali metals and alkaline earth metals and the hydrides of the corresponding metals, viz. sodium hydride, potassium hydride, rubidium hydride, caesium hydride, lithium hydride, barium hydride, calcium hydride and strontium hydride, are very active as catalysts in the dehydrogenation of hydrocarbons, such as paraffins and alicyclic hydrocarbons, and of dehydrogenizable hydrocarbon compounds. Reference is made to the copending application of Leon W. Wright, Serial No. 377,669, filed August 31, 1953, describing a process for the catalytic hydrogenation of organic materials employing as the hydrogenation catalyst a catalyst characterized by a mixture of: at least one member of the class consisting of the alkali metals and alkaline earth metals; and the hydrides of the corresponding metals. This invention concerns the dehydrogenation of hydrocarbons as distinguished from the hydrogenation methods of said application.

It is, therefore, an object of the present invention to dehydrogenate dehydrogenizable hydrocarbons, such as paraffins, naphthenes and other alicyclic hydrocarbons, and hydrocarbon compounds free from interfering substituents in the presence of intimate mixtures of one or more alkali metals or alkaline earth metals with hydrides of the corresponding metals.

Other objects and advantages of the invention appear from the following specification and the claims.

It has been found that the activity of mixtures of the free alkaline earth metals with their hydrides as catalysts in such processes is high. This is particularly the case with the mixtures of the metals and the hydrides of calcium and barium. They are active in this respect over a wide temperature range, for example at temperatures as low as about 250 to 325° C., but also at temperatures up to 400° C. and higher, e. g. at about 500 to 600° C. The decomposition temperatures of the metal hydrides of the class described are very high; that of barium hydride and those of the other alkaline earth metal hydrides being highest; that of lithium hydride being next high, while those of the other alkali metal hydrides, though still very high, are substantially lower.

In order to prevent any disassociation or decomposition of the metal hydrides present in the multi-component catalyst during their use as dehydrogenation catalysts, it is advisable, particularly when working at high temperatures, to carry out the dehydrogenation under gas pressure, particularly under hydrogen pressure, though this pressure, generally, may be fairly low. Thus, on dehydrogenating cyclohexane, for example, in the presence of a calcium hydride catalyst at a temperature of about 427° C. a hydrogen pressure of $1.2 \times 10^{-5}$ atmosphere has proved sufficient. The hydrogen pressure employed should preferably be higher if the dehydrogenation is carried out at still higher temperatures. For the example given above, a minimum hydrogen pressure of about $2.9 \times 10^{-4}$ atmosphere is recommended at a treating temperature of about 527° C. and a hydrogen pressure of about $3.5 \times 10^{-3}$ atmosphere at a temperature of about 627° C. Substantially higher hydrogen pressures are preferably employed in practical operation.

The use of an intimate mixture of a free alkali or alkaline earth metal with a hydride of this metal as the catalyst has proven to be particularly beneficial. Intimate mixtures of the said free metals with their hydrides can be obtained in various ways. For instance, an intimate mixture of this type can be successfully obtained by evacuating the metal hydride in question, for example calcium hydride of commerce or prepared in situ, for an extended period e. g. overnight, at an elevated temperature, e. g. at a temperature of 200 to 300° C. These conditions of temperature and period of treatment, however, are not critical.

A similar mixture of free metal and hydride may also be obtained by incompletely hydriding the metal in question, in other words by stopping the treatment of the heated metal with hydrogen before all the metal present has been converted into the corresponding hydride. Mechanically mixing of the finely divided free metal with the finely divided hydride may also bring about good results in certain cases.

The multi-component catalyst comprising a mixture of alkali metals or alkaline earth metals and their hydrides may be employed distributed in finely divided form on a support inert under the reaction conditions of the dehydrogenation, so that a comparatively very large surface area for the catalyst is obtained; or they may be mechanically mixed with such inert materials. Quartz is, for example, well suited for this purpose. The use of such supports may be desired if the reaction temperature is above the melting point of the metallic component of the mixed catalyst. On the other hand, the liquid state under the reaction conditions of the catalyst employed can in certain cases be useful for efficient heat transfer to overcome the endothermic effects of the dehydrogenation.

*Example 1*

The disadvantage of using a calcium hydride catalyst as distinguished from a catalyst comprising a mixture of metal and the corresponding hydride was shown by the use of quite a high temperature (525° C.) in isobutane dehydrogenation. Isobutane has been dehydrogenated by passing it at atmospheric pressure and at a temperature of 525° C. over a catalyst composed of 10 parts of calcium hydride on 5 parts of heat treated quartz with gaseous space velocities of about 60-240 v./v./hr. (volumes gas at S. T. P./volume catalyst/hour). The contact time was correspondingly about 60 to 15 seconds. The percentage amounts of isobutylene found in the exit gas varied with the space velocity and the contact time used, best results being obtained with a low space velocity.

*Example II*

Even using barium hydride, which is superior to calcium hydride, disadvantages are encountered in using a pure hydride instead of a mixed catalyst, as shown by the relatively low yields (in view of the high temperatures and low space rates) in certain runs. In dehydrogenating cyclohexane in a nonstatic system over barium hydride at a temperature of 450 to 475° C., 7-17% of benzene were found in the liquid products, while only traces of cracked hydrocarbons were contained in the exit gases. The olefin content of the liquid product was smaller than 1%.

Cyclohexane was treated at a temperature of about 500° C., with a hydrogen pressure of 300 pounds per square inch, a hydrogen to hydrocarbon oil ratio of 4:1 and an hourly space velocity of 1 to 4 v./v./hr. (on the basis on liquid cyclohexane). The mixture of cyclohexane and molecular hydrogen was passed under these conditions over a catalyst composed of 50 cc. of 6 mesh calcium hydride (95%) mixed with 50 cc. of quartz. This catalyst has shown good stability for example over a nine hour on-stream period and more. Best results again are obtained with low space velocities. Thus, with an hourly space velocity of 1 v./v./hr. a yield of about 40% aromatics was obtained after 4 hours on stream.

In substituting barium hydride for calcium hydride as the active part of the catalyst, at least as high conversion levels have been obtained under corresponding operating conditions.

By using hydride catalysts spread over a wide surface area, as obtained, for example, by impregnating solutions of the metals on high area surfaces such as activated charcoal, silica wool, alumina, or celite, the specific activity of the metal hydrides may be increased by a factor of three. In the manufacture of such supported catalysts, the metal in question, for example calcium or barium, may be dissolved in liquid ammonia or an organic amine, such as ethylene diamine, and the solution thus obtained be impregnated on the high area support, whereupon the ammonia or the like solvent is pumped off, for example at a temperature of —40 to —80° C., and the dispersed metal is hydrided in situ with hydrogen in the manner usual in producing the metal hydrides, generally.

*Example III*

Significantly superior results were obtained by using a mixed catalyst. The dehydrogenation of cyclohexene was effected in a nonstatic system in the presence of a catalyst comprising a mixture of metallic barium and barium hydride, which mixture was prepared from barium hydride which, before use, had been evacuated for one hour at a temperature of about 300° C. The elevated temperature evacuation decomposed a portion of the barium hydride to metallic barium. The cyclohexene was introduced to the system by means of an inert carrier gas (helium) which was bubbled through liquid cyclohexene at about 30° C. The temperature of the charge was raised to run temperature and passed over the catalyst at a space of 0.2 liquid volume of cyclohexene per volume of catalyst per hour. At a temperature of 300° C. about 32% aromatics were obtained in the effluent, about 96.5% aromatics were formed at a temperature of 400° C. and about 98% at 475° C. In other words, at these higher temperatues almost complete conversion of cyclohexene to benzene is effected. No disproportionation by forming cyclohexane from cyclohexene took place in these runs.

The dehydrogenation of suitable paraffins does not end with the formation of mono-olefins; diolefins, particularly dienes, such as butadiene from butane, and polyolefins can also be formed by this process. Hydrocarbon compounds which beside carbon and hydrogen contain other elements or groups may be treated for dehydrogenation in a corresponding manner, provided that such elements or groups or the compounds formed therefrom during the reaction do not damage the activity of the catalyst employed. In this respect it is to be borne in mind, that the metal hydrides are very sensitive to polar compounds having labile hydrogen, such as water, alcohol, and the like. For this reason, the presence or formation even of traces of water in the reaction mixture should be carefully avoided in order to obtain best results and to maintain the activity of the catalyst for a long period of use.

Mixtures comprising the hydrides of two or more alkali metals and/or alkaline earth metals with the corresponding metals may also be used as dehydrogenation catalysts under conditions similar to those set out above.

Obviously, many modifications and variations of the invention as hereinbefore set forth may be made without departing from the spirit and scope thereof, and therefore only such limitations should be imposed as are indicated in the appended claims.

What is claimed is:

1. The process of catalytically dehydrogenating dehydrogenizable hydrocarbon compounds having a nucleus of at least 3, but not more than 6 carbon atoms which comprises treating such compounds in the presence of a dehydrogenation catalyst comprising an intimate mixture of at least one metal of the group consisting of the alkali metals and alkaline earth metals and the hydride of said metal, the quantity of metal hydride being the major portion of said intimate mixture of metal hydride and metal, said treating being under appropriate dehydrogenation conditions including the maintenance of space velocity in the range of at least 0.2 and not more than 4 liquid volumes of compound per volume of catalyst per hour, the maintenance of temperature within the range of from at least 450° C. to not more than 600° C. and the maintenance of at least $1.2 \times 10^{-5}$ atmospheres hydrogen pressure.

2. The process in accordance with claim 1 wherein said catalyst comprises calcium hydride.

3. The process in accordance with claim 1 wherein said catalyst comprises barium hydride.

4. The process in accordance with claim 1 wherein said free metal comprises the product of the partial decomposition of said hydride.

5. The process in accordance with claim 1 wherein the catalyst is one produced by impregnating a support material of relatively large surface area and inert under the dehydrogenating conditions with a solution of said metal, treating said active metal deposited on said support with hydrogen under conditions suitable to form the hydride of said metal, and thereafter partially decomposing the metal hydride to form a minor amount of metal by evacuating the catalyst thus obtained at an elevated temperature in the range of 200 to 300° C. for a time period of at least several hours.

6. The process in accordance with claim 1 wherein the catalyst is one produced by treating such metal in finely divided state with hydrogen under conditions suitable for forming the hydride of the metal, and continuing said hydrogen treatment for a time period sufficient to convert a major portion of said metal to the hydride, said time period being insufficient to convert all of said metal to said hydride.

7. The process in accordance with claim 1 which comprises passing such dehydrogenizable compound and molecular hydrogen over a catalyst containing a major amount of calcium-hydride and a minor amount of metallic calcium at a hydrogen to liquid hydrocarbon ratio of about 4:1 and at an hourly space velocity of about 1 to 4 volumes of such compound (as liquid) per hour per volume of the catalyst.

References Cited in the file of this patent

UNITED STATES PATENTS

| | | |
|---|---|---|
| 1,968,208 | Hugel et al. | July 31, 1934 |
| 2,381,522 | Stewart | Aug. 7, 1945 |
| 2,586,377 | Pitzer | Feb. 19, 1952 |
| 2,745,887 | Pines et al. | May 15, 1956 |

OTHER REFERENCES

"Catalysis" (Berkman et al.), pub. by Reinhold Pub. Corp. (N. Y.), 1940 (page 244 relied on).

"Catalysis" (Berkman et al.), publ. by Reinhold Publ. Corp. (N. Y.), 1940 (page 565–566 relied on).